US012655792B2

(12) United States Patent
Hallisey et al.

(10) Patent No.: US 12,655,792 B2
(45) Date of Patent: Jun. 16, 2026

(54) COMBUSTION ENGINE INCLUDING TURBOMACHINE

(71) Applicant: GE Aviation Systems LLC, Grand Rapids, MI (US)

(72) Inventors: Kevin P. Hallisey, Ave Maria, FL (US); Dominique Patrick Sautron, Chicago, IL (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 11 days.

(21) Appl. No.: 17/091,210

(22) Filed: Nov. 6, 2020

(65) Prior Publication Data

US 2022/0145796 A1    May 12, 2022

(51) Int. Cl.
F02C 9/18    (2006.01)
F02C 5/12    (2006.01)
F02C 7/143    (2006.01)

(52) U.S. Cl.
CPC ............... F02C 5/12 (2013.01); F02C 7/143 (2013.01); F02C 9/18 (2013.01); F05D 2220/323 (2013.01); F05D 2240/35 (2013.01); F05D 2260/606 (2013.01)

(58) Field of Classification Search
CPC .... F02C 9/18; F02C 9/52; F02C 7/185; F02C 6/08; F02C 5/12; F02C 7/143; F05D 2260/606; F04D 15/0011; F04D 27/02; F04D 27/0215
See application file for complete search history.

(56) References Cited

U.S. PATENT DOCUMENTS

| | | | |
|---|---|---|---|
| 2,800,002 A | 7/1957 | Seed | |
| 3,441,045 A | 4/1969 | Malone | |
| 3,842,720 A | 10/1974 | Herr | |
| 4,262,495 A | 4/1981 | Gupta et al. | |
| 4,378,920 A | 4/1983 | Runnels et al. | |

(Continued)

FOREIGN PATENT DOCUMENTS

| | | |
|---|---|---|
| CN | 102341590 A | 2/2012 |
| CN | 104343538 A | 2/2015 |

(Continued)

OTHER PUBLICATIONS

U.S. Department of Transportation, Federal Aviation Administration, "Airplane Flying Handbook", 2004, 26 pages, US.

(Continued)

*Primary Examiner* — Phutthiwat Wongwian
*Assistant Examiner* — Jacek Lisowski
(74) *Attorney, Agent, or Firm* — Thomas I Horstemeyer, LLP

(57)    ABSTRACT

A combustion engine including at least one combustion chamber, a first bleed air supply fluidly coupled to a portion of the combustion engine upstream the combustion chamber, a second bleed air supply fluidly coupled to a portion of the combustion engine downstream the combustion chamber, and a turbomachine comprising a first compressor, a second compressor, and a first turbine mounted to a common shaft, with the first and second compressors in serial flow arrangement. The turbomachine, further comprising an intercooler serially fluidly coupling a portion of the first compressor to a portion of the second compressor.

17 Claims, 4 Drawing Sheets

(56) References Cited

U.S. PATENT DOCUMENTS

| | | | |
|---|---|---|---|
| 4,503,666 | A | 3/1985 | Christoff |
| RE32,100 | E | 4/1986 | Rannenberg |
| 4,684,081 | A | 8/1987 | Cronin |
| 5,036,678 | A | 8/1991 | Renninger et al. |
| 5,086,622 | A | 2/1992 | Warner |
| 5,143,329 | A | 9/1992 | Coffinberry |
| 5,452,573 | A | 9/1995 | Glickstein et al. |
| 5,813,630 | A | 9/1998 | Williams |
| 5,899,085 | A | 5/1999 | Williams |
| 5,899,805 | A | 5/1999 | Dowd et al. |
| 5,967,461 | A | 10/1999 | Farrington |
| 6,189,324 | B1 | 2/2001 | Williams et al. |
| 6,412,270 | B1 | 7/2002 | Mortzheim et al. |
| 6,415,595 | B1 * | 7/2002 | Wilmot, Jr. ............. F02C 7/224 |
| | | | 60/785 |
| 6,526,775 | B1 | 3/2003 | Asfia et al. |
| 6,629,428 | B1 | 10/2003 | Murry |
| 6,681,592 | B1 | 1/2004 | Lents et al. |
| 6,796,131 | B2 | 9/2004 | Sampson |
| 6,942,183 | B2 | 9/2005 | Zywiak |
| 7,607,318 | B2 | 10/2009 | Lui et al. |
| 7,618,008 | B2 | 11/2009 | Scherer et al. |
| 8,461,710 | B1 | 6/2013 | Brostmeyer |
| 8,904,805 | B2 | 12/2014 | Hipsky et al. |
| 8,955,794 | B2 | 2/2015 | Mackin et al. |
| 8,967,528 | B2 | 3/2015 | Mackin et al. |
| 9,021,780 | B2 | 5/2015 | Bowman et al. |
| 9,394,803 | B2 | 7/2016 | Suciu et al. |
| 9,752,462 | B1 | 9/2017 | Fletcher |
| 9,810,050 | B2 | 11/2017 | Sites et al. |
| 9,957,051 | B2 | 5/2018 | Bruno et al. |
| 10,012,146 | B2 * | 7/2018 | Pelagatti ................ B64D 13/02 |
| 10,100,733 | B2 * | 10/2018 | O'Toole ................ B64D 13/08 |
| 10,160,547 | B2 | 12/2018 | Bruno et al. |
| 10,184,494 | B2 | 1/2019 | Army et al. |
| 10,247,100 | B2 | 4/2019 | Leamy et al. |
| 10,294,873 | B2 | 5/2019 | Papa et al. |
| 10,358,221 | B2 | 7/2019 | Sautron |
| 10,550,770 | B2 | 2/2020 | Foutch et al. |
| 2007/0243811 | A1 | 10/2007 | Alecu et al. |
| 2010/0170265 | A1 | 7/2010 | Whaling et al. |
| 2011/0162386 | A1 | 7/2011 | Chandrabose et al. |
| 2012/0031600 | A1 * | 2/2012 | Dhingra ................. F02C 7/143 |
| | | | 165/173 |
| 2012/0260667 | A1 | 10/2012 | Chillar et al. |
| 2013/0187007 | A1 | 7/2013 | Ludlow et al. |
| 2014/0250898 | A1 | 9/2014 | Mackin et al. |
| 2015/0059397 | A1 | 3/2015 | Bruno et al. |
| 2015/0065023 | A1 | 3/2015 | Bruno |
| 2015/0247463 | A1 | 9/2015 | DeFrancesco |
| 2015/0251765 | A1 | 9/2015 | Jonqueres et al. |
| 2016/0090917 | A1 | 3/2016 | Bruno et al. |
| 2017/0074172 | A1 | 3/2017 | Little |
| 2017/0233081 | A1 | 8/2017 | Sautron et al. |
| 2018/0057170 | A1 | 3/2018 | Sautron |
| 2018/0057171 | A1 * | 3/2018 | Sautron ................ B64D 13/06 |
| 2018/0057172 | A1 * | 3/2018 | Sautron ................ B64D 13/06 |
| 2019/0040876 | A1 | 2/2019 | Army et al. |

FOREIGN PATENT DOCUMENTS

| | | |
|---|---|---|
| CN | 104520660 A | 4/2015 |
| EP | 2339296 A2 | 6/2011 |
| EP | 2845803 A1 | 3/2015 |
| EP | 2862803 B1 | 11/2016 |
| EP | 2966278 B1 | 4/2018 |
| EP | 2918497 B1 | 11/2018 |
| EP | 3002431 B1 | 7/2019 |

OTHER PUBLICATIONS

S. Chiesa et al, "Turbojet Analytical Model Development and Validation", Sep. 23-28, 2012, 10 pages.
Interpreting Piping and Instrumentation Diagrams—Symbology, Jan. 8, 2015, 1 page.
Edraw, Standard Process Flow Diagram Symbols and Their Usage, Mar. 12, 2015, 5 pages.

* cited by examiner

COMBUSTION ENGINE INCLUDING TURBOMACHINE

TECHNICAL FIELD

This disclosure generally relates to a combustion engine, and more specifically a combustion engine of an aircraft including a turbomachine.

BACKGROUND

Combustion engines, specifically gas or combustion gas turbine engines, are rotary engines that extract energy from a flow of combusted gases passing through the engine onto a multitude of rotating turbine blades.

A gas turbine engine includes but is not limited to, in serial flow arrangement, a fan section, a compressor section, a combustion section, and a turbine section. The compressor, combustor and turbine sections are sometimes collectively referred to as the core engine.

Gas turbine engines can further include or otherwise be coupled to a turbomachine which can used to generate electricity for the aircraft or provide the work force for operating aircraft systems, like the environmental control system, such as the air conditioning system.

BRIEF DESCRIPTION

In one aspect of the present disclosure, a combustion engine comprising at least one combustion chamber, a first bleed air supply fluidly coupled to a portion of the combustion engine upstream of the combustion chamber, a second bleed air supply fluidly coupled to a portion of the combustion engine downstream of the combustion chamber, and a turbomachine comprising a first compressor, a second compressor, and a first turbine mounted to a common shaft with the first and second compressors in serial flow arrangement, with the first compressor fluidly coupled to the first bleed air supply, and an intercooler serially fluidly coupling a portion of the first compressor to a portion of the second compressor.

In another aspect of the present disclosure, an aircraft comprising a gas turbine engine having a fan section, compressor section, combustion section, and turbine section in serial flow arrangement, an external system, a first bleed air supply fluidly coupled to a portion of the combustion engine upstream of the combustion chamber, a second bleed air supply fluidly coupled to a portion of the combustion engine downstream of the combustion chamber, and a turbomachine comprising a first compressor, a second compressor, and a first turbine mounted to a common shaft with the first and second compressors in serial flow arrangement, with the first compressor fluidly coupled to the first bleed air supply, and the second compressor fluidly coupled to external system, and an intercooler serially fluidly coupling a portion of the first compressor to a portion of the second compressor.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
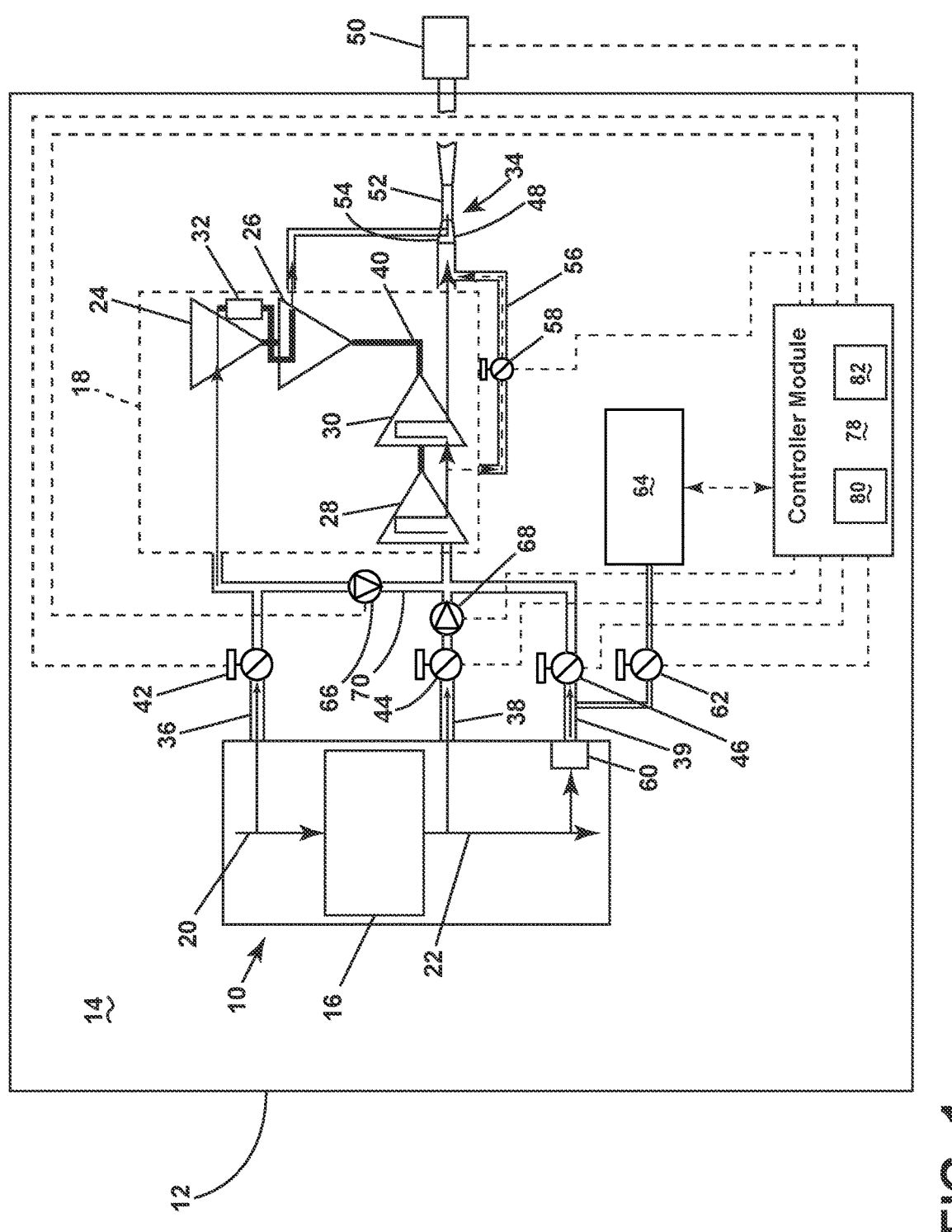
FIG. 1 is a schematic view of a combustion engine including a turbomachine according to various aspects described herein.

Aspects of the disclosure described herein are directed to a combustion engine including a combustion chamber and set of bleed air supplies fluidly coupled to a turbomachine fluidly. Specifically, a first bleed air supply fluidly coupled to a portion of the combustion engine upstream the combustion chamber, a second bleed air supply fluidly coupled to a portion of the combustion engine downstream the combustion chamber, and a third bleed air supply fluidly coupled to a portion of the combustion engine downstream the combustion chamber further downstream where the second bleed air supply is fluidly coupled to the combustion engine. As used herein, the term "combustion engine" can refer to any suitable engine configured to take a fluid (e.g., air), inject a fuel into the fluid to form a fuel and fluid mixture and subsequently combust the mixture within combustion chamber to produce a working fluid that can be used to output a physical work from the combustion engine. For example, the combustion engine can be a gas turbine engine including a combustor section configured to combust a compressed fluid from a compressor section of the gas turbine engine and output a combusted fluid to a turbine section of the gas turbine engine to produce a physical work of the gas turbine engine. In terms of the gas turbine engine, the first bleed air supply can be fluidly coupled to a fan section or compressor section upstream the combustor section of the gas turbine engine, the second bleed air supply can be fluidly coupled to a turbine section or an exhaust section downstream the combustor section of the gas turbine engine, and the third bleed air supply can be fluidly coupled to the turbine section or the exhaust section downstream of where the second bleed air supply is fluidly coupled to the turbine engine.

As used herein, the term "turbomachine" can refer to any suitable system included within the combustion engine including at least a turbine and a compressor, each configured to receive a fluid from at least a portion of the combustion engine. The turbomachine can include a first compressor fluidly coupled to the first bleed air supply, an intercooler, a second compressor, a first turbine fluidly coupled to at least one of the first bleed air supply, the second bleed air supply, or the third bleed air supply, and a second turbine. The first compressor, the intercooler, and the second compressor can be serially fluidly coupled such that the fluid from the first bleed air supply flows through the first compressor, to the intercooler, and ultimately through the second compressor. Similarly, the first and second turbines can be serially fluidly coupled such that the fluid from at least one of the first, second, or third bleed air supplies flows through the first turbine and to the second turbine. At least a portion of the turbomachine can be fluidly coupled to a turbo-ejector configured to accelerate and cool a fluid within the turbo-ejector. Specifically, the fluid within the second compressor and second turbine can define an output of the turbomachine that is ultimately supplied to at least a portion of the turbo-ejector.

It is contemplated that the turbomachine can further include a fluid bypass from the first turbine to the turbo-ejector such that at least a portion of the fluid within the first turbine can bypass the second turbine and flow into a portion of the turbo-ejector to further define at least a portion of the output of the turbomachine. The turbo-ejector can fluidly couple the output of the turbomachine with an external system such as, but not limited to, an Environmental Control System (ECS) of an aircraft. As such, the fluid output of the turbo-ejector can be defined as a fluid input to the external system. The third bleed air supply can include a pre-cooler provided within a portion of the combustion engine and be fluidly coupled to a source of ambient air. Specifically, the pre-cooler can be fluidly coupled to a fan section of the combustion engine. The pre-cooler can be configured to draw heat from the fluid within the third bleed air supply before it is supplied to the turbomachine or to a subsystem of the combustion engine. The subsystem can be any suitable system of the combustion engine or system fluidly coupled to the combustion engine that is configured to receive a fluid flow from a downstream portion of the combustion engine such as, but not limited to, an anti-ice system. It will be appreciated that each the first, second and third bleed air supplies can be selectively fluidly coupled to at least a portion of the turbomachine or the subsystem through a set of valves.

The turbomachine as described herein, specifically with the implementation of the intercooler, the first bleed air supply and the set of valves, can allow for a high-pressure fluid to be injected into the turbomachine without increasing the temperature. In other words, the first compressor and the second compressor can compress or pressurize the fluid to be provided to the turbo-ejector to a preferred pressure, while the intercooler can draw heat from the compressed fluid within the first compressor such that the fluid being injected into the turbo-ejector is of a desired pressure and temperature. Without the use of the intercooler, the fluid being provided to the turbo-ejector from the second compressor would be of a desired pressure, however, would be at too high of a temperature. As such, with the implementation of the turbomachine described herein, the fluid entering the turbo-ejector can control or mitigate the pressure losses related with the injection of fluid into the turbo-ejector while still ensuring the turbo-ejector outputs to the external system at the desired pressure, temperature, and speed. In terms of the combustion engine being the gas turbine engine, the first and second turbines of the turbomachine can draw fluid from one or more of an upstream portion of the combustion engine, an upstream stage of the turbine section (e.g., from the high-pressure turbine of the gas turbine engine), or from a downstream stage of the turbine section (e.g., from the low-pressure turbine of the gas turbine engine), with the fluid from the downstream stage of the turbine section being cooled by the pre-cooler. This allows for increased control of the temperature and pressure of the fluid entering the turbo-ejector from at least a portion of the turbomachine. At least a portion of the turbomachine can include a fluid bypass such that an upstream portion and a downstream portion of the turbomachine can be fluidly coupled to the turbo-ejector. This yet further ensures the temperature and pressure of the fluid entering the turbo-ejector is at the desired value. The inclusion of these aspects can ensure various other cooling systems downstream the turbo-ejector are not needed thus reducing the overall weight of the components needed to effectively run the external system. This ultimately results in fuel savings for the combustion engine along with increased space optimization or ease of integration.

While the description will generally pertain to a combustion engine, and more specifically to a gas turbine engine included on an aircraft, it will be appreciated that the combustion engine can be any suitable combustion engine such as, but not limited to, a compression ignition engine, a spark ignition engine, a gas turbine engine, a Liquified Natural Gas (LNG) engine, or the like. In terms of the gas turbine engine, it will be appreciated that the gas turbine engine can be any suitable gas turbine engine such as, but not limited to, a counter-rotating gas turbine engine, a propfan gas turbine engine, a turbojet gas turbine engine, a turboprop gas turbine engine, or the like. Therefore, the combustion engine as described herein will also have applicability in other environments where combustion engines can be used such as, but not limited to, aircraft, non-aircraft, terrestrial, as well as any other suitable environments.

As used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, fixed, connected, joined, and the like) are to be construed broadly and can include intermediate members between a collection of elements and relative movement between elements unless otherwise indicated. As such, connection references do not necessarily infer that two elements are directly connected and in fixed relation to one another. The singular forms "a," "an," and "the" include plural references unless the context clearly dictates otherwise.

The exemplary drawings are for purposes of illustration only and the dimensions, positions, order and relative sizes reflected in the drawings attached hereto can vary.

FIG. 1 illustrates a combustion engine 10 including a housing 12 defining an interior 14, a combustion chamber 16, and a turbomachine 18. The combustion engine 10 can be defined by an upstream portion 20 and a downstream portion 22 with respect to the combustion chamber 16. The turbomachine 18, as described herein, can include a first compressor 24, a second compressor 26, a first turbine 28, and a second turbine 30. An intercooler 32 can be serially received between the first compressor 24 and the second compressor 26. The combustion engine 10 can further include a turbo-ejector 34 fluidly coupled to at a least a portion of the turbomachine 18.

A first bleed air supply 36, a second bleed air supply 38, and a third bleed air supply 39 can each fluidly coupled at least a portion of the combustion engine 10 to a corresponding portion of the turbomachine 18. Specifically, the first bleed air supply 36 can fluidly couple the first compressor 24 of the turbomachine 18 to the upstream portion 20 of the combustion engine 10, while both the second and third bleed air supplies 38, 39 can fluidly couple the first turbine 28 to the downstream portion 22 of the combustion engine 10. As such, the first compressor 24 can be fluidly coupled to a portion of the combustion engine 10 upstream the combustion chamber 16, and the first turbine 28 can be fluidly coupled to at least one portion of the combustion engine 10 downstream the combustion engine 10. As illustrated, the second and third bleed air supplies 38, 39 can be fluidly coupled to one another such that the fluid within the second and third bleed air supplies 38, 39 can mix before entering the turbomachine 18 through the first turbine 28. It will be, further comprising appreciated that the fluid flowing within the first, second, and third bleed air supplies 36, 38, 39 can be further defined by their contaminates. For example, during the combustion process, fluid flows into the combustion chamber 16 from the upstream portion 20 where it is subsequently mixed with fuel and combusted. This process creates engine exhaust gases or combustion gases that are transferred to the downstream portion 22 of the combustion engine 10. As the fluid from the first bleed air supply 36 comes from the upstream portion 20, it does not contain exhaust gases. Conversely, the fluid from the second and third bleed air supplies 38, 39 contain engine exhaust gases as it comes from the downstream portion 22 of the combustion engine 10.

The second compressor 26 can be serially fluidly coupled to the first compressor 24 downstream of the first compressor 24, with the intercooler 32 provided between the first and second compressors 24, 26. As such, the first and second compressors 24, 26 can be serially fluidly coupled to at least a portion of the upstream portion 20 of the combustion engine 10. Similarly, the second turbine 30 can be serially fluidly coupled to the first turbine 28 downstream of the first turbine 28. As such, the first and second turbines 28, 30 can be serially fluidly coupled to at least a portion of the downstream portion 22 of the combustion engine 10.

The first compressor 24, the second compressor 26, the first turbine 28, and the second turbine 30 of the turbomachine 18 can each be drivingly or operably coupled to one another through a common shaft 40. The rotation of the first and second turbines 28, 30 can drive the rotation of the first and second compressors 24, 26 through rotation of the common shaft 40. Alternatively, the common shaft 40 can include a first and second shafts. The first shaft can operatively or drivingly couple the first turbine 28 to the first compressor 24, while the second shaft can operatively or drivingly couple the second turbine 30 to the second compressor 26. In such a case, it is contemplated that the first shaft can be received within the second shaft.

The first, second, and third bleed air supplies 36, 38, 39 can be fluidly coupled to at least a portion of the turbomachine 18 by way of a first valve 42, a second valve 44, and a third valve 46, respectively. The first, second, and third valves 42, 44, 46 can operate in response to, related to, or as a function of the combustion engine 10 operational phase or the rotational speed of the combustion engine 10. For example, the rotational speed of the combustion engine 10 can vary within an operating cycle, during which the first and second valves 42, 44 can be adjusted based on combustion engine 10 transient or dynamic conditions in order to supply the needed amount of fluid through the first, second, and third bleed air supplies 36, 38, 39 to the turbomachine 18.

The turbo-ejector 34 can include a venturi 48 defining a throat 52. The turbo-ejector 34 can be fluidly coupled to at least a portion of the turbomachine 18. Specially, the turbo-ejector 34 can be fluidly coupled to at least one of the first or second turbines 28, 30 at an upstream portion of the turbo-ejector 34 through the venturi 48. The turbo-ejector 34 can further include a tap 54 upstream the throat 52 that is fluidly coupled to another portion of the turbomachine 18. Specifically, the tap 54 can be fluidly coupled to the second compressor 26. Additionally, or alternatively, it will be appreciated that the tap 54 can be fluidly coupled to the first compressor 24.

A bypass 56 can fluidly couple a portion of the first turbine 28 to an upstream portion of turbo-ejector 34, specifically the venturi 48. A bypass valve 58, similar to the first, second, or third valves 42, 44, 46, can be included within the bypass 56 in order to selectively fluidly couple the first turbine 28 to the turbo-ejector 34. In other words, fluid within the first turbine 28 can selectively bypass the second turbine 30 and be injected directly into the turbo-ejector 34. It is contemplated that the fluid within the bypass 56 can be of a higher temperature and a higher pressure than the fluid exiting the second turbine 30.

The turbo-ejector 34 can further be fluidly coupled to a at least a portion of an external system 50 downstream the turbo-ejector 34. As used herein, the term "external system" can refer to any system that is external the combustion engine 10 and configured to receive an output from at least a portion of the combustion engine 10, specifically the turbomachine 18 and the turbo-ejector 34. As a non-limiting example, the external system 50 can be an Environmental Control System (ECS) for a suitable environment (e.g., a vehicle, a building, an aircraft, etc.), or any other suitable external system 50. The connection between the turbo-ejector 34 and the external system 50 is schematically illustrated as a broken-line. As such, it will be appreciated that various other components can be included between the turbo-ejector 34 and the external system 50. For example, an ozone converter or additional valves can be provided between the turbo-ejector 34 and the external system 50. These other components can be utilized to ensure the fluid entering the external system 50 is of a desired quality and suitable for use within the external system 50. For example, the ozone converter can include a catalyst material configured to reduce contaminates (e.g., ozone or volatile organic compounds generated during the combustion process of the combustion engine 10) from entering the external system 50. Various components such as this can be necessary in systems where contaminates from the combustion engine 10 can enter the air stream which flows through the turbo-ejector 34. For example, as discussed herein the fluid within the second and third bleed air supplies 38, 39 can be from the downstream portion 22 of the combustion engine 10, which can include engine exhaust gases. These engine exhaust gases could be potentially harmful or otherwise be unsuitable for use within the external system 50. As such, the ozone converter, or other components between the turbo-ejector 34 and the external system 50 can remove these contaminates from the air before it enters the external system 50.

The intercooler 32 can be serially fluidly coupled between the first and second compressors 24, 26. As such, fluid from the first compressor 24 can flow through the intercooler 32 and ultimately to the second compressor 26. The intercooler 32 can be defined as a portion of the turbomachine 18 configured to transfer heat from the fluid in the first compressor 24 to a portion of the combustion engine 10 fluidly coupled to the intercooler 32. For example, the intercooler 32 can be fluidly coupled to a fan of the combustion engine 10. The fan of the combustion engine 10 can be configured to draw in an ambient airflow from exterior the combustion engine 10. This ambient airflow can subsequently be fluidly coupled to the intercooler 32. It is contemplated that the ambient airflow can be of a lower temperature than the fluid within the intercooler 32 from the first compressor 24 such that at least a portion of the heat of the fluid from the first compressor 24 transfers or is otherwise dumped into the ambient airflow. As such, the fluid leaving the intercooler 32 and entering the second compressor 26 can be of a lower temperature than the fluid that entered the intercooler 32 from the first compressor 24.

A pre-cooler 60 can be fluidly coupled to the third bleed air supply 39 upstream the third valve 46. The pre-cooler 60, similar to the intercooler 32, can be provided within a portion of the combustion engine 10 including or otherwise exposed to ambient air. As such, the fluid that is drawn from the downstream portion 22 of the combustion engine 10 by the third bleed air supply 39 can run through the pre-cooler 60. It is contemplated that the fluid within the third bleed air supply 39 and upstream the pre-cooler 60 can be of a higher temperature than the ambient air that is fluidly coupled to the pre-cooler. As such, heat from the fluid within the pre-cooler 60 can be transferred or dumped into the ambient air such that the temperature of the fluid entering the pre-cooler 60 is higher than the temperature of the fluid leaving the pre-cooler 60 and ultimately supplied to a downstream portion of the third bleed air supply 39 (e.g., the third valve 46).

It is contemplated that the intercooler 32 and the pre-cooler 60 can include any suitable heat transfer device. For example, intercooler 32 and the pre-cooler 60 can all be heat exchangers configured to transfer or exchange heat from one fluid to another.

A fourth valve 62 can be fluidly coupled to a portion of the third bleed air supply 39. Specifically, the third bleed air supply 39 can include a branch upstream the third valve 46 and downstream the pre-cooler 60, with the fourth valve 62 fluidly coupled to the branch. Specifically, the branch can include a first branch that can lead to the third valve 46 and a second branch that can lead to the fourth valve 62. The fourth valve 62 can be similar in function to the first, second, third, and bypass valves 42, 44, 46, 58, however, the fourth valve 62 can be configured to supply at least a portion of the fluid within the third bleed air supply 39 to at least a portion of a subsystem 64 of the combustion engine 10. Specifically, the subsystem 64 can be an anti-ice system or other heating system of the combustion engine 10. In terms of the anti-ice system, the subsystem 64 can be configured to detect, eliminate, or melt ice accretion on one or more sections of the combustion engine 10 (e.g., on the exterior of the housing 12) or on other environments surrounding the combustion engine 10 or fluidly coupled to the combustion engine 10. In such a case, the fluid supplied to the subsystem 64 via the fourth valve 62 can be of a temperature suitable to melt ice or otherwise suitable to heat the environment the subsystem 64 is configured to heat.

The first, second, third, and fourth controllable valve assemblies 76, 78, 79, 83 can operate in response to, related to, or as a function of the aircraft flight phase or the rotational speed of the gas turbine engine 110. For example, the rotational speed of the gas turbine engine 110 can vary within an operating cycle, during which the first, second, third, and fourth controllable valve assemblies 76, 78, 79, 83 can be adjusted based on turbine engine transient or dynamic conditions.

As illustrated, the first bleed air supply 36 can be fluidly coupled to both the second and third bleed air supplies 38, 39 through a fluid path 70. A first check valve 66 can be provided along a portion of the fluid path 70 and be biased such that fluid can only flow from the first bleed air supply 36, downstream the first valve 42 to the mix with at fluid from at least the second or third bleed air supplies 38, 39. In other words, fluid from the second or third bleed air supplies 38, 39 cannot flow through the fluid path 70 and into the first compressor 24 of the turbomachine 18. A second check valve 68 can be provided along the second bleed air supply 38, downstream from the second valve 44 and upstream where the second bleed air supply 38, the third bleed air supply 39, and the fluid path 70 meet. The second check valve 68 can be biased such that fluid within the second bleed air supply 38 can flow through the second check valve 68 and into the first turbine 28, however, fluid downstream the second check valve 68 cannot flow past the second check valve and into the second bleed air supply 38. It is contemplated that the first, second, and third valves 42, 44, 46 can be selectively operated to control the temperature, pressure, flow rate, or contaminate level (e.g., the amount of engine exhaust gases within the fluid) of the fluid entering the first turbine 28. For example, if the third valve 46 is closed, and the first and second valves 36, 38 are opened such that fluid from the first bleed air supply 36 is flowing into the first compressor 24, and fluid within the second bleed air supply 38 is flowing into the first turbine 28, it can be desired to lower the temperature of the fluid entering the first turbine 28. As the fluid within the first bleed air supply 36 is of a lower temperature than the fluid within the second bleed air supply 38, the first valve 42 can be opened such that fluid can flow from the first bleed air supply 36, through the fluid path 70 and the first check valve 66 to mix with the fluid of the second bleed air supply 38, downstream the second check valve 68, before entering the first turbine 28. This effectively lowers the temperate of the fluid entering the first turbine 28. It is contemplated that in some cases, the second and third valves 44, 46 can be closed and the first valve 42 can be opened such that only fluid from the upstream portion 20 of the combustion engine 10 flows into both the first compressor 24 and the first turbine 28 of the turbomachine 18.

The combustion engine 10 can further include a controller module 78 having a processor 80 and a memory 82. The controller module 78 or processor 80 can be operably or communicatively coupled to various portions of the system described herein, such as, for example, the external system 50, the subsystem 64, the first, second, third, bypass, and fourth valves 42, 44, 46, 58, 62, or the like. It will be, further comprising appreciated that sensors can be provided through the combustion engine 10 to measure various characteristics of the combustion engine 10 or components thereof. For example, a sensor can be located upstream of, downstream of, or within the turbo-ejector 34 in order to monitor or measure the pressure and temperature of at various location with respect to the turbo-ejector 34. It will be appreciated that the controller module 78 can be configured to selectively operate the first, second, and third valves 42, 44, 46 to selectively fluidly couple the respective first, second, or third bleed air supplies 36, 38, 39 to at least a portion of the turbomachine 18. It will be, further comprising appreciated that the controller module 78 can selectively operate the bypass and fourth valves 58, 62 to selectively supply or otherwise limit the airflow to the turbo-ejector 34 and the subsystem 64, respectively. The memory 82 can include random access memory (RAM), read-only memory (ROM), flash memory, or one or more different types of portable electronic memory, such as discs, DVDs, CD-ROMs, etc., or any suitable combination of these types of memory.

In operation, the turbomachine 18 can receive a first and a second fluid flow from the first bleed air supply 36 and from at least one of the first, second, or third bleed air supplies 36, 38, 39, respectively. As discussed herein, the first bleed air supply 38 is fluidly coupled to the upstream portion 20 of the combustion engine 10, thus the first fluid flow is defined as a fluid flow without engine exhaust gases. The second and third bleed air supplies 38, 39 is fluidly coupled to a downstream portion 22 of the combustion engine 10, thus the second fluid flow, in most instances, is defined as a fluid flow with engine exhaust gases. The only time where the second fluid flow would not include engine exhaust gases would be if the second and third valves 44, 46 were closed and the first valve 42 was opened such that the second fluid flow and the first fluid flow would both be from the first bleed air supply 36 only. It will be, further comprising appreciated that the first and second fluid flows can be defined by at least their temperature. Specifically, the second fluid flow can be at a higher temperature than the first fluid flow due to the fact that the combustion chamber 16 introduces heat into the system through the combustion process. As such, a fluid flow within the downstream portion 22 of the combustion engine 10 will be hotter than a fluid flow within the upstream portion 20.

As such, during operation of the combustion engine 10 a hot fluid flow or engine exhaust gases from the downstream portion 22 of the combustion engine 10 can enter the turbomachine 18 via the second or third bleed air supplies 38, 39. Specifically, the second fluid flow can be delivered directly to the first turbine 28. As the first turbine 28 is serially fluidly coupled to the second turbine 30, the first turbine 28 can supply the second fluid flow to the second turbine 30. As the second fluid flow goes from the first turbine 28 to the second turbine 30, work is extracted and the common shaft 40 is rotated. As a result of the work done as the second fluid flow moves through the first and second turbines 28, 30, the fluid flow in the second turbine 30 can be defined as a low-temperature and low-pressure fluid flow when compared to the fluid flow in the first turbine 28. The rotation of the common shaft 40 can subsequently rotate other portions of the turbomachine 18, specifically the first and second compressors 24, 26. At least one of the first or second compressors 24, 26 can be fluidly coupled to the first bleed air supply 36 such that the first fluid flow from the upstream portion 20 be drawn into the turbomachine 18. At least a portion of the first fluid flow can subsequently flow through the intercooler 32 and to the second compressor 26 or otherwise be provided directly to the second compressor 26. As discussed herein, the intercooler 32 can be configured to cool the first fluid flow from the first compressor 24 such that the first fluid flow is cooler when it enters the second compressor 26 than when it leaves the first compressor 24. The intercooler 32 can be used in instances where it is desired to lower the temperature of the first fluid flow while also increasing the pressure. As the first fluid flow goes through the first and second compressors 24, 26 the first fluid flow is pressurized, which results in an increase of temperature. The intercooler 32 can be used to cool the pressurized first fluid flow within the first compressor 24 before it enters the second compressor 26 to be pressurized more. As a result, the first fluid flow that exits the second compressor 26 and is directed to the turbo-ejector 34 can be of a lower temperature and similar pressure when compared to the first fluid flow that would exit the second compressor 26 if the first fluid flow were not diverted though the intercooler 32 and instead supplied directly form the first compressor 24 to the second compressor 26.

As described herein, the selective opening and closing, by the controller module 78, of the first, second, and third valves 42, 44, 46 can provide for a control of the temperature, the pressure, or the contaminate level of the first and second fluid flows entering the turbomachine 18. Further yet, the selective opening and closing, by the controller module 78, of the bypass valve 58 can provide for further control of the temperature and pressure of the second fluid flow as it enters the turbo-ejector 34. Specifically, the opening of the bypass valve 58 can allow for a portion of the second fluid flow to bypass the second turbine 30 through the bypass 56. As the temperature of the second fluid flow is higher in the first turbine 28 than in the second turbine 30, the second fluid flow entering the turbo-ejector 34 will be higher than if all of the second fluid flow went through the second turbine 30 and none went through the bypass 56. As such, the selective control of the first, second, third, and bypass valves 42, 44, 46, 58 can ultimately result in the control of the temperature, pressure, and contaminate level (amount of engine exhaust gases) of both the first and second fluid flows entering the turbo-ejector 34.

The first and second fluid flows can ultimately be supplied to a corresponding portion of the turbo-ejector 34. Specifically, the first fluid flow can be provided to the turbo-ejector 34 through the tap 54 and the second fluid flow can be provided to the turbo-ejector 34 upstream the tap 54 at an upstream portion of the venturi 48. The first and second fluid flow can be combined to form a fluid flow within the turbo-ejector 34 that is at a desired temperature and pressure. The fluid flow within the turbo-ejector 34 can be sped up from an upstream portion to a downstream portion of the turbo-ejector 34 as the fluid flows through the venturi 48. Further, as the fluid flow within the turbo-ejector 34 flows into the venturi 48 it is compressed, and as it flows past the throat 52 and out the venturi 48, the fluid flow expands. This expansion of the fluid flow subsequently cools the fluid flow, as such, the fluid flow at an upstream portion of the turbo-ejector 34 is cooler than the fluid flow exiting the turbo-ejector 34. The fluid flow within the turbo-ejector 34 can ultimately be supplied to at least a portion of the external system 50. The control of the first, second, third, and bypass valves 42, 44, 46, 58 can ultimately control the temperature and pressure of the fluid flow exiting the turbo-ejector 34. The turbo-ejector 34 itself can speed up and cool the fluid flow. It will be appreciated that the pressure, temperature, and rate of the fluid flow within the turbo-ejector 34 can be can be adjusted by adjusting the amount of the first and second fluid flows that are supplied to the turbo-ejector 34. The pressure, temperature and rate of the fluid flow can be adjusted according to the needs of the external system 50. For example, if the external system 50 requires a high-pressure, high-temperature fluid, then the input of the turbo-ejector 34 that defines the fluid flow within the turbo-ejector 34 (e.g., the first and second fluid flows) can be adjusted, through the selective operation of the first, second, third, and fourth valves 42, 44, 46, 58 such that a larger amount of the first fluid flow enters the turbo-ejector 34 than the second fluid flow.

The fourth valve 62 can be selectively controlled, by the controller module 78, to selectively fluidly coupled the third bleed air supply 39 to the subsystem 64. This control can be based on the demand of the subsystem 64. For example, if the subsystem 64 or the controller 78 communicatively coupled to the subsystem 64, determines a need for the subsystem 64, then the controller module 78 can open the fourth valve 62 in order to fluidly couple the third bleed air supply 39 to the subsystem 64. As a non-limiting example, the subsystem 64 can be the anti-ice system configured to detect and eliminate the accretion of ice. If the anti-ice system detects the presence of ice, then the anti-ice system can report the accretion of ice to the controller module 78 or otherwise send a request to the controller module 78 to open the fourth valve 62 and supply fluid from the third bleed air supply 39 to the anti-ice system. In either case, the controller module 78 can open the fourth valve 62. It is contemplated, however, that a fluid flow from at least the first or second bleed air supplies 36, 38 can be supplied to at least a portion of the subsystem 64. This can be done by including discrete bypasses (not illustrated) from downstream the first and second valves 42, 44 such that fluid from the first and second bleed air supplies 36, 38 can be supplied to the subsystem 64 by selectively opening the first or second valves 42, 44, respectively. Additionally, or alternatively, the first, second, third, and fourth valves 42, 44, 46, 62 can be selectively opened such that fluid from the first or second bleed air supplies 36, 38 can flow past the third and fourth valves 46, 62 and into the subsystem 64. It is yet further contemplated that the subsystem 64 can include a set of sensors configured to monitor for conditions that would require the subsystem 64 to be fluidly coupled to the third bleed air supply 39 (e.g., the subsystem 64 detects the presence of ice). The subsystem 64 can further include a separate controller module or processor that reads the sensors to determine the need for the fluid from the third bleed air supply 39, otherwise, the controller module 78 can be configured to monitor the set of sensors in order to determine the need for fluid from the third bleed air supply 39 to be supplied to the subsystem 64.

Figure 2:
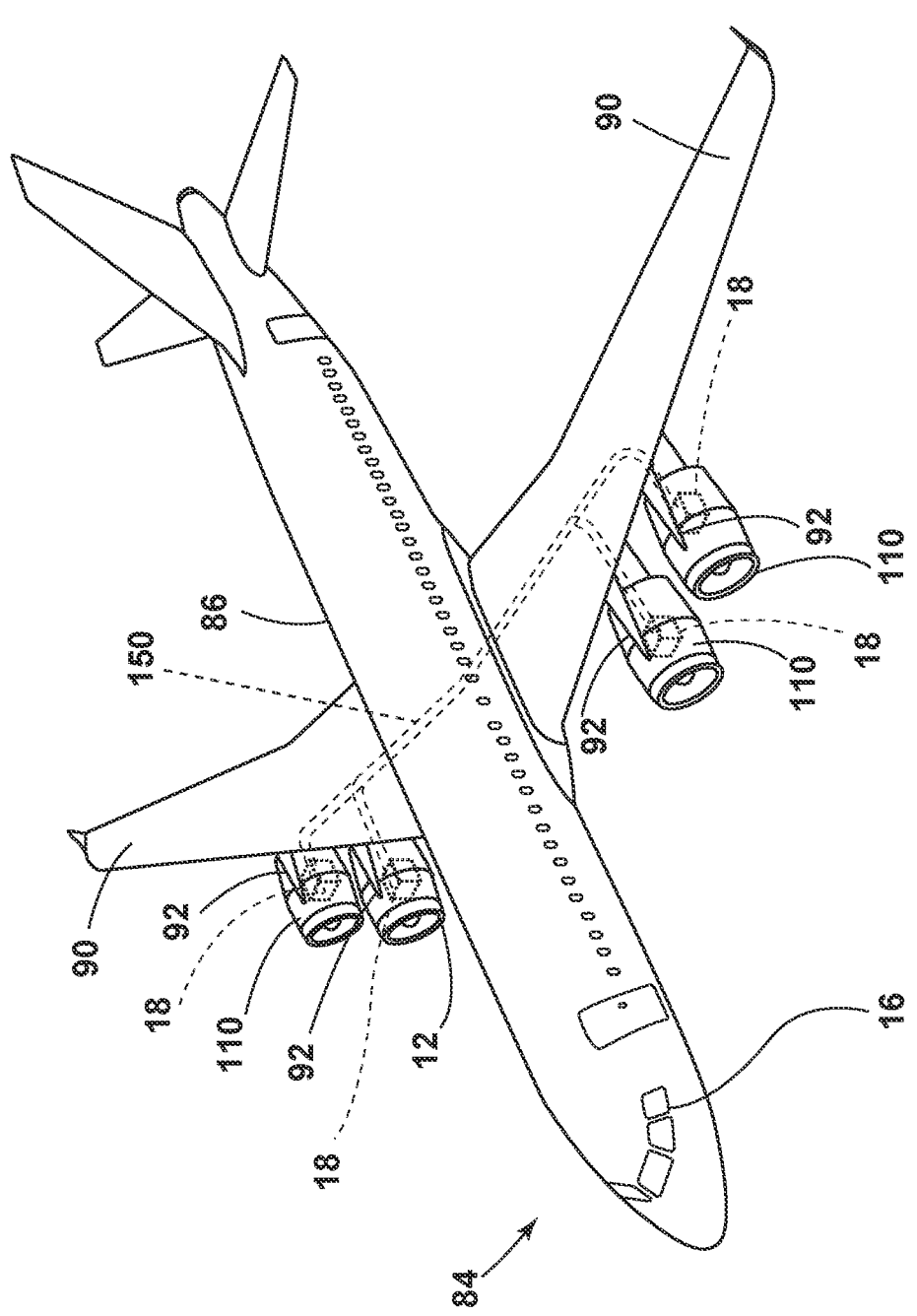
FIG. 2 is a perspective view of an aircraft including an exemplary combustion engine including the turbomachine FIG. 1, according to various aspects described herein.

FIG. 2 illustrates a set of exemplary combustion engines, specifically a set of gas turbine engines 110 provided on an aircraft 84. The set of gas turbine engines 110 are each similar to the combustion engine 10; therefore, like parts will be identified with like numerals in the 100 series, with it being understood that the description of the like parts of combustion engine 10 applies to the set of gas turbine engines 110 unless otherwise noted.

The aircraft 84 can include the set of gas turbine engines 110, a fuselage 86, a cockpit 88 positioned in the fuselage 86, and wing assemblies 90 extending outward from the fuselage 86. Each gas turbine engine 110 can include a corresponding turbomachine 18 integrally formed within the gas turbine engine 110. An exemplary external system, specifically an ECS 150, is schematically illustrated in a portion of the fuselage 86 of the aircraft 84 for illustrative purposes only. The ECS 150 can be fluidly coupled to at least a portion of the set of gas turbine engines 110.

It is contemplated that the fluid coupling of the ECS 150 to at least a portion of the gas turbine engine 110 can provide a coolant source to the ECS 150, a source of power, or a source of bleed air from the gas turbine engine 110. For example, a bleed air system can be fluidly coupled to at least a portion of the gas turbine engine 110 to provide a high temperature, high pressure, low pressure, low temperature, or a combination thereof source of air. This air can be used within the aircraft 84 for environmental control of the aircraft 84. Alternatively, it is contemplated that ambient air can be used within the aircraft 84 for environmental control of the aircraft 84. As used herein, the environmental control of the aircraft 84, that is, the ECS 150 of the aircraft 84, can include subsystems for anti-icing or de-icing a portion of the aircraft, for pressurizing the cabin or fuselage, heating or cooling the cabin or fuselage 86, and the like. The operation of the ECS 150 can be a function of at least one of the number of aircraft passengers, aircraft flight phase, or operational subsystems of the ECS 150. Examples of the aircraft flight phase can include, but is not limited to ground idle, taxi, takeoff, climb, cruise, descent, hold, and landing.

An engine pylon 92 can be included with each gas turbine engine 110 of the set of gas turbine engines 110. The engine pylon 92 can operatively couple a corresponding gas turbine engine 110 to the respective wing assembly 90.

While a commercial aircraft 84 has been illustrated, it is contemplated that embodiments of the invention can be used in any type of aircraft 84. Further, while two gas turbine engines 110 have been illustrated on each wing of the wing assemblies 90, it will be understood that any number of gas turbine engines 110 mounted on the wing assemblies 90, or even a single gas turbine engine mounted in the fuselage 86 can be included.

Figure 3:
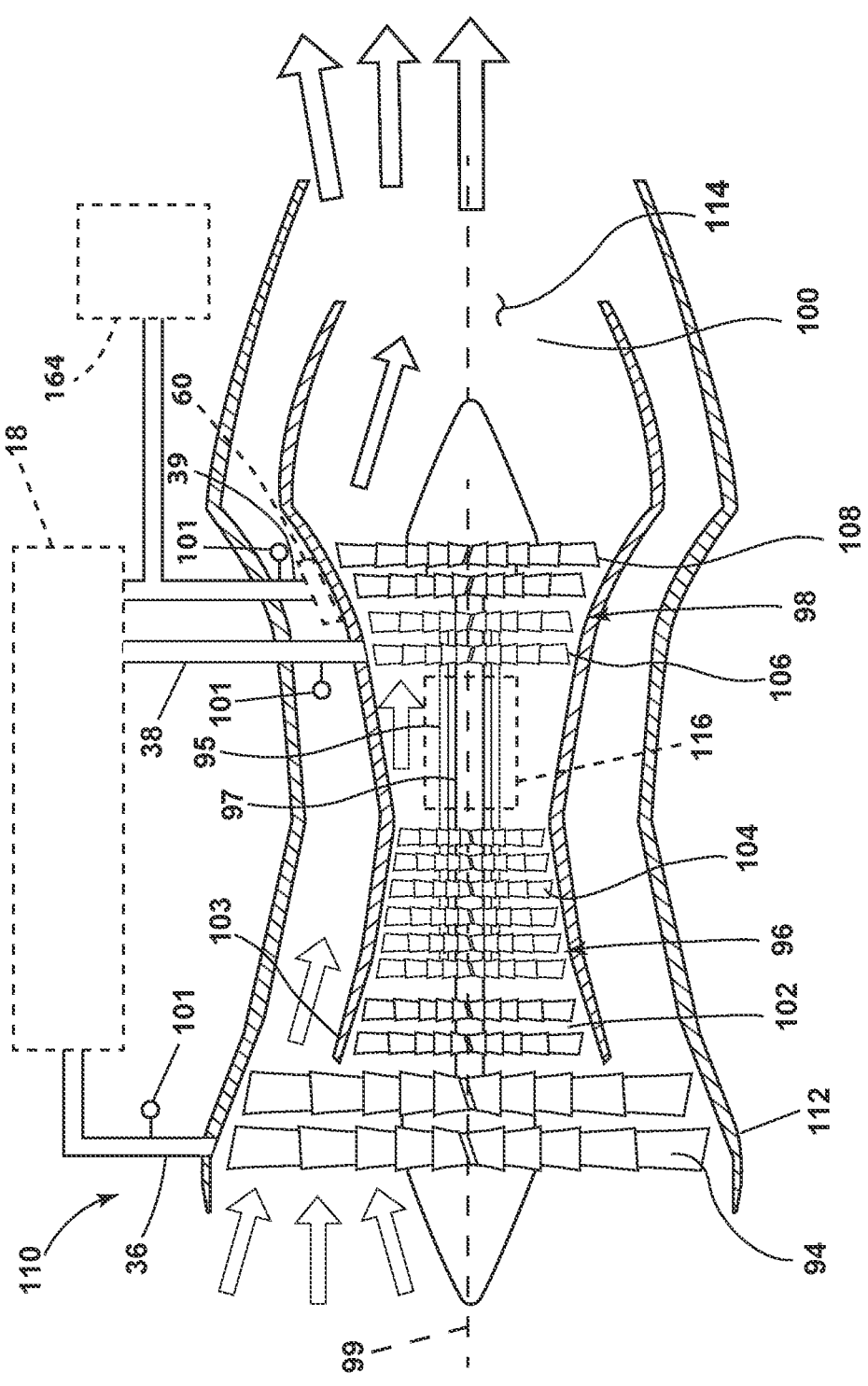
FIG. 3 is a schematic cross-sectional view of a portion of the exemplary combustion engine of FIG. 2, according to various aspects described herein.

FIG. 3 illustrates a cross section of the gas turbine engine 110 of the aircraft 84 of FIG. 2. The gas turbine engine 110 can include, in a serial relationship, a fan section 94 including a fan, a compressor section 96, a combustion section 116, a turbine section 98, and an exhaust section 100. The compressor section 96 can include, in a serial relationship, a multi-stage low pressure (LP) compressor 102, and a multi-stage high pressure (HP) compressor 104. The turbine section 98 can include, in a serial relationship, a multi-stage high-pressure (HP) turbine 106, and a multi-stage low-pressure (LP) turbine 108.

A drive shaft can operatively couple at least an upstream portion of the gas turbine engine 110 to a downstream portion of the gas turbine engine 110. It will be appreciated that the combustion section 116 can include a combustion chamber similar to the combustion chamber 16 (FIG. 1). It will be yet further appreciated that as used herein, the term "upstream portion" and "downstream portion" is analogous to upstream portion 20 and downstream portion 22 of the combustion engine 10 (FIG. 1), respectively, in that the upstream portion of the gas turbine engine 110 is upstream the combustion section 116 and the downstream portion of the gas turbine engine 110 is downstream the combustion section 116. An HP shaft or HP spool 95 disposed coaxially about a centerline 99 of the gas turbine engine 110 drivingly connects the HP turbine 106 to the HP compressor 104, and an LP shaft or LP spool 97, which is disposed coaxially about the centerline 99 of the gas turbine engine 110 within the larger diameter annular HP spool 95, drivingly connects the LP turbine 108 to the LP compressor 102 and the fan of the fan section 94. The HP and LP spools 95, 97 are rotatable about the engine centerline 99.

The first bleed air supply 36 can be configured to pull, draw, or receive bleed air from an upstream portion of the gas turbine engine 110 such as, but not limited to, the fan section 94, at least a portion of the compressor section 96, or a portion upstream of the fan section 94 such that it is configured to receive ambient air. The second and third bleed air supplies 38, 39 can be configured to pull, draw, or receive bleed air from a downstream portion of the gas turbine engine 110 such as, but not limited to, a portion of the combustion section 116 in which combustion has already occurred, at least a portion the turbine section 98, or the exhaust section 100. As illustrated, the third bleed air supply 39 can draw bleed air from a portion of the gas turbine engine 110 further downstream than where the second bleed air supply 38 draws bleed air from the gas turbine engine 110. Although illustrated as first, second, and third bleed air supplies 36, 38, 39 it will be appreciated that the first, second, and third bleed air supplies 36, 38, 39 can be included within a set of bleed air supplies configured to draw air from various portions of the gas turbine engine 110. The first, second, and third bleed air supplies 36, 38, 39 are illustrated to be coupled with various sensors 101, which can provide corresponding output signals. By way of non-limiting example, the sensors 101 can include one or more of temperature sensors, flow rate sensors, or pressure sensors. It is further contemplated that one or more of the bleed air supplies can include a bleed air supplies from an auxiliary power units (APU) or ground cart units (GCU) such that the APU or GCU can provide an augmented pressure and conditioned temperature airflow in addition to or in place of the first, second, or third bleed air supplies 36, 38, 39. The first, second, and third bleed air supplies 36, 38, 39 can be fluidly coupled to at least a portion of the turbomachine 18 (shown schematically as a dotted box exterior the gas turbine engine 110). It is contemplated that the first, second, and third bleed air supplies 36, 38, 39 can be configured to supply air from three or more portions of the gas turbine engine 110 to at least a portion of the turbomachine 18.

The gas turbine engine 110 can further include a nacelle 112 or housing defining an interior 114 of the gas turbine engine 110. It will be appreciated that the nacelle 112 can be integrally formed with or include the engine pylon 92 (FIG. 1). As discussed herein, although schematically illustrated as being received exterior the gas turbine engine 110, the turbomachine 18, can be provided within any portion of the interior 114 of the gas turbine engine 110. For example, the turbomachine 18 and its accompanying components can be at least partially, provided within the nacelle 112, the engine pylon 92 or any other suitable component of the gas turbine engine 110. It is yet further contemplated that at least a portion of the turbomachine 18 can be mechanically coupled to at least a portion of the gas turbine engine 110. For example, a portion of the turbomachine 18 can be coupled to a drive shaft (e.g., the LP or HP spools 95, 97) of the gas turbine engine 110. As such, the rotation of the drive shaft can drive at least a portion of the turbomachine 18.

The gas turbine engine 110 can include an exemplary subsystem, specifically a Wing-Anti Ice (WAI) system 164 that can be provided within the interior 114 of the gas turbine engine 110 and be fluidly coupled to the third bleed air supply 39. Alternatively, the WAI system 164 can be external the gas turbine engine 110 and only be fluidly coupled to a portion of the gas turbine engine 110. The WAI system 164 can be configured to detect, eliminate, or melt ice accretion on one or more sections of the aircraft 84, specifically the wing assemblies 90. As such, the fluid supplied to the WAI system 164 by the third bleed air supply 39 can be of a temperature suitable to melt ice. Although described in terms of the WAI system 164, it will be appreciated that the subsystem of the gas turbine engine 110 can be any suitable subsystem such as, but not limited to, an On-Board Inert Gas Generating System (OBIGGS), or other types of on-board cooling systems for electronics.

In operation, the airflow exiting the fan section 94 is split such that a portion of the airflow is channeled into the compressor section 96, specifically through the LP compressor 102, which then supplies a pressurized airflow to the HP compressor 104, which further pressurizes the air. The remaining portion of the air split at the fan section 94 can go through a bypass air duct 103 which can be funneled into a portion of the gas turbine engine 110 downstream the fan section 94 (e.g., the turbine section 98 to cool at least a portion of the turbine section 98) or otherwise mix with the engine exhaust gases in the exhaust section 100. As illustrated, the pre-cooler 60 can be provided within a portion of the bypass air duct 103. As such, the air within the bypass air duct 103, defined as an ambient airflow, can flow over the or through the pre-cooler 60 and draw heat from the fluid within the third bleed air supply 39 as described herein. Although illustrated as being coupled to an interior wall or a wall closest to the centerline 99 of the bypass air duct 103, it will be appreciated that the pre-cooler 60 can be coupled to any portion of the bypass air duct 103 or to the nacelle 112. The pressurized airflow from the HP compressor 104 is mixed with fuel in the combustor section 116 and ignited, thereby generating combustion gases or engine exhaust gases. Some work is extracted from these combustion gases by the turbine section 98, specifically the HP turbine 106, which drives the HP compressor 104. The combustion gases are discharged into the LP turbine 108, which extracts additional work to drive the LP compressor 102, and the engine exhaust gas is ultimately discharged from the gas turbine engine 110 via the exhaust section 100. The driving of the LP turbine 108 drives the LP spool 97 to rotate the fan section 94 and the LP compressor 102. The driving of the HP turbine 106 drives the HP spool 95 to rotate the HP compressor 104.

Air from the upstream portions of the gas turbine engine 110, specifically air from the fan section 94 can be provided to at least a first portion of the turbomachine 18 via the first bleed air supply 36, air from a first downstream portion of the gas turbine engine 110, specifically the HP turbine 106 can be provided to at least a second portion of the turbomachine 18 via the second bleed air supply 38, and air from a second downstream portion of the gas turbine engine 110, specifically the LP turbine 108, can be provided to at least the second portion of the turbomachine 18 via the third bleed air supply 39 or to the WAI system 164. As such a first airflow defined as a low-pressure, low-temperature air flow can be provided to the turbomachine 18 via the first bleed air supply 36, and a second airflow defined as a high-pressure, high-temperature airflow can be provided to the turbomachine 18 via the second bleed air supply 38.

Figure 4:
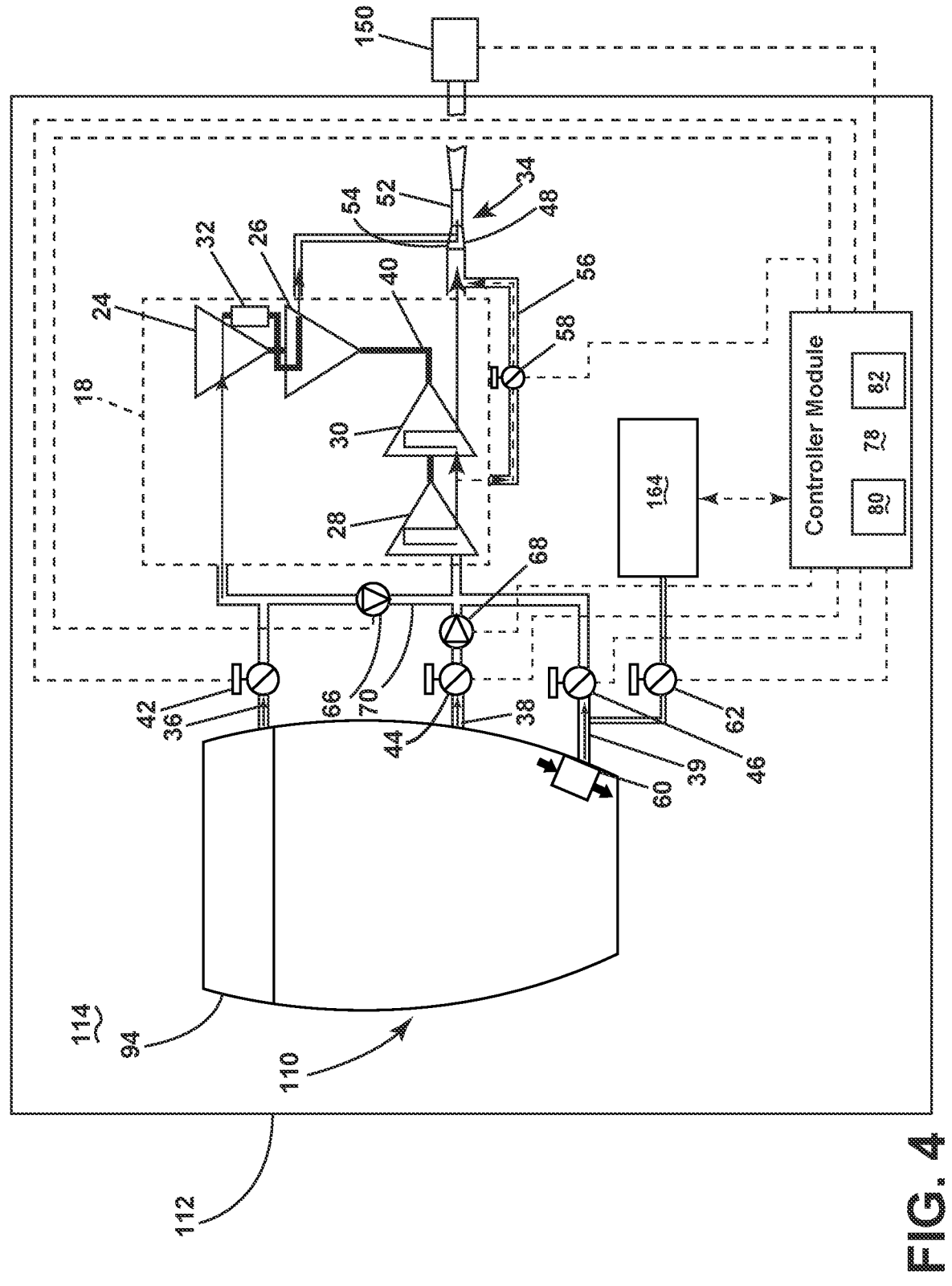
FIG. 4 is a schematic view of the turbomachine of the exemplary combustion engine of FIG. 2 further including an intercooler according to various aspects described herein.

FIG. 4 illustrates a schematic view of the gas turbine engine 110 of FIG. 2 including the turbomachine 18, and the turbo-ejector 34.

Although illustrated as exterior the gas turbine engine 110, it will be appreciated that the turbomachine 18, the first, second, and third bleed air supplies 36, 38, 39, the pre-cooler 60, or the turbo-ejector 34 can be received within the interior 114 defined by the nacelle 112. It will be, further comprising appreciated any of the turbomachine 18, the first, second, and third bleed air supplies 36, 38, 39, the pre-cooler 60, or the turbo-ejector 34 can be received within any other suitable portion of the gas turbine engine 110. For example, the turbomachine 18, the first, second, and third bleed air supplies 36, 38, 39, or the turbo-ejector 34 can be received within or otherwise integrated with the drive shaft of the gas turbine engine 110, the engine pylon 92, the nacelle 112, or any other portions formed within the interior 114 of the gas turbine engine 110.

The intercooler 32 can be configured to cool or otherwise draw heat from at least a portion of the fluid exiting the first compressor 24. It is contemplated that the intercooler 32 can be received within a portion of the gas turbine engine 110 exposed to an ambient airflow such as, but not limited to, the bypass air duct 103 or the fan section 94. As such, at least a portion of the heat within the fluid exiting the first compressor 24 can be transferred or dumped into the ambient airflow such that the fluid within the intercooler 32 is cooled before entering the second compressor 26. It is further contemplated that the intercooler can be received in or otherwise fluidly coupled to various other portions of the gas turbine engine 110 or the aircraft 84. For example, the intercooler 32 can be fluidly coupled to a RAM air scoop of the aircraft 84 or a portion of the ECS 150.

As discussed herein, the first, second, and third bleed air supplies 36, 38, 39 can be fluidly coupled to at least a portion of the turbomachine 18 by way of the first valve 42, the second valve 44, and the third valve 46, respectively. In one aspect, the first, second, and third valves 42, 44, 46 can be arranged to supply the low-pressure, low-temperature and high-pressure, high-temperature bleed air to one or more portions of the turbomachine 18. Specifically, the first valve 42 can supply air from the fan section 94, or another upstream portion of the gas turbine engine 110, to the first compressor 24, the first turbine 28, or a combination thereof, the second valve 44 can supply air from a portion of the turbine section 98, specifically the HP turbine 106, to the first turbine 28, and the third bleed air supply 39 can supply air from a portion of the turbine section 98, specifically the LP turbine 108, or the exhaust section 100 to the first turbine 28, the WAI system 164, or a combination thereof. As discussed herein, the fluid provided directly to the compressor 24 and the first turbine 28 from the first, second, or third bleed air supplies 36, 38, 39, can further be defined by the presence or absence of engine exhaust gases. Specifically, the fluid provided to the first turbine 28 can include engine exhaust gases as it is fluidly coupled, through the second and third bleed air supplies 38, 39, to a downstream portion of the gas turbine engine 110 (e.g., the turbine section 98, or the exhaust section 100), while the first compressor 24 is fluidly coupled, through the first bleed air supply 36, to an upstream portion of the gas turbine engine 110 (e.g., the fan section 94, upstream the fan section 94, the compressor section 96, or within the bypass air duct 103). Specifically, the first bleed air supply 36 can be fluidly coupled to at least a portion of the fan section 94, the second bleed air supply 38 can be fluidly coupled to at least a portion of the HP turbine 106, and the third bleed air supply 39 can be fluidly coupled to a late stage of the LP turbine 108. As illustrated, the turbo-ejector 34 can be fluidly coupled to an exemplary external system, specifically the ECS 150 of the aircraft 84. As discussed herein, the connection between the turbo-ejector 34 and the ECS 150 is illustrated as a broken line as one or more additional components can be provided between the turbo-ejector 34 and the ECS 150. The additional components can include, but are not limited to, an ozone converter, water separators, valves, sensors, or a combination thereof. As such, the fluid exiting the turbo-ejector 34 can be treated, or otherwise configured for use within the ECS 150 or any other suitable external system.

The aircraft 84 can further include the controller module 78 having the processor 80 and the memory 82. The controller module 78 or processor 80 can be operably or communicatively coupled to various portions of the system described herein such as, for example, at least a portion of the ECS 150, the WAI system 164, the sensors 101 (FIG. 3), the first, second, third, bypass or fourth valves 42, 44, 46, 58, 62, or the like. It will be, further comprising appreciated that additional sensors 101 can be provided throughout the aircraft 84 such that the data from the sensors can be used by the controller module 78 to operate at least a portion of the gas turbine engine 110. For example, a contaminate sensor can be positioned downstream the turbo-ejector 34 to sense for the presence of engine exhaust gases within the fluid exiting the turbo-ejector 34 before it enters the ECS 150. If the contaminate sensor detects the presence of engine exhaust gases within the fluid exiting the turbo-ejector 34, the fluid can be diverted through an ozone converter or through other treating components to remove the potentially harmful contaminates (e.g., engine exhaust gases) from the fluid before it enters the ECS 150. The controller module 78 or processor 80 can further be configured to run any suitable programs. Non-limiting embodiments of the disclosure can be included wherein, for example, the controller module 78 or processor 80 can also be connected with other controllers, processors, or systems of the aircraft 84, or can be included as part of or a subcomponent of another controller, processor, or system of the aircraft 84. In one example, the controller module 78 can include a full authority digital engine or electronics controller (FADEC), an onboard avionic computer or controller, or a module remoted located by way of a common data link or protocol.

Benefits of the present disclosure include an increased efficiency of cooling the fluid entering the ECS when compared to traditional methods of cooling the fluid entering the ECS. For example, traditional systems rely on the turbo-ejector to create the pressurized fluid entering the ECS, however, the pressurized fluid is of a temperature not suitable to enter the ECS. Specifically, the temperature would be too high to enter the ECS. As such, traditional systems rely on an exit heat exchanger to cool the pressurized fluid before it enters the ECS. These exit heat exchangers can be large and require separate coolant loops to pump or supply a coolant to the exit heat exchanger such that the pressurized fluid can dump at least a portion of its heat into the coolant. In some instances, the coolant used can be ambient air from the fan section. As the ECS can be remote or otherwise displaced from the fan section of the gas turbine engine, a bypass from the fan section of the gas turbine engine can be needed. The bypass can require additional components (e.g., additional valves, check valves, etc.) to supply the coolant to the exit heat exchanger. The system described herein, however, does not need the exit heat exchanger as the temperature of the pressurized fluid leaving the turbo-ejector is already at the desired temperature to enter the ECS. This is due, in part, to the fact that the turbomachine as described herein includes a first compressors, an intercooler, and a second compressor serially fluidly coupled to one another. As fluid enters the first compressor it is compressed or pressurized resulting in an increase of temperature. The fluid is then supplied to the intercooler fluidly coupled to an ambient air supply (e.g., the fan section) where it is cooled and then supplied to the second compressor. As the fluid exiting the intercooler is not at the desired pressure, the fluid is then compressed or pressurized further by the second compressor before being diverted to the turbo-ejector. This arrangement results in the fluid being input into the turbo-ejector from the second compressor to be of a higher pressure and a lower or similar temperature than when compared to traditional systems. As such, the systems as described herein do not require additional bulky components such as the exit heat exchanger in order to cool the fluid flow exiting the turbo-ejector before it is supplied to the ECS. This results in a lower weight, which ultimately results in a higher efficiency of the gas turbine engine or the aircraft when compared to traditional gas turbine engines.

Further benefits include an enhanced control over the pressure, temperature, and source of the fluid being supplied to the turbo-ejector when compared to traditional combustion engines. For example, traditional combustion engines including a turbomachine and a turbo-ejector can include two bleed air supplies from varying portions of the combustion engine, normally upstream the combustion chamber. The fluid from the first and second bleed air supplies can be coupled to a corresponding portion of the turbomachine, and subsequently to the turbo-ejector. The pressure and temperature of the fluid entering the turbomachine is dependent on the exact pressure and temperature of the fluid where the first and second bleed air supplies are fluidly coupled to. During operation of the external system, the demands of the external system can change. For example, the external system can require a hotter or colder fluid at different times during its operation. Traditional systems rely on additional components provided downstream the turbo-ejector to meet this demand. Such as, for example, the exit heat exchanger to cool the fluid exiting the turbo-ejector or a heater to heat the fluid exiting the turbo-ejector. The combustion engine as described herein, however, includes the first, second, and third bleed air supplies fluidly coupled to both upstream and downstream sections of the combustion engine. The first, second, and third bleed air supplies are further selectively fluidly coupled to corresponding portions of the turbomachine through selective operation of a series of valves (e.g., the first, second, and third valves) by the controller module. The series of valves, along with the multiple of sources of bleed air allow for a selective fluid coupling of the combustion engine to the turbomachine. As such, the pressure and temperature of the fluid input of the first compressor and the first turbine of the turbomachine can be controlled by the selective operation of the set of valves and the set of check valves. This fluid flow can ultimately be output from the turbomachine and into the turbo-ejector where it is sped up and supplied to the external system. Further control of the temperature and pressure of the fluid entering the turbo-ejector can come from the fluid bypass of the first turbine that allows for at least a portion of the fluid within the first turbine to bypass the second turbine and be supplied directly to the turbo-ejector. It will be appreciated that this control can be done by a controller module that is operatively coupled to the external system. As such, the controller module can monitor the demand of the external system and open or close corresponding valves or check valves to ultimately change the pressure and temperature of the fluid outputs form the turbomachine that will be supplied to the turbo-ejector and ultimately to the external system. This results in the enhanced control over the pressure, temperature, and source of the fluid being supplied turbomachine and to the turbo-ejector when compared to traditional combustion engines. This ultimately eliminates the need for additional components downstream the turbo-ejector that would otherwise be needed to control the temperature and pressure of the fluid entering the external system, which in turn decreases the overall weight and size of the combustion engine thus increasing the efficiency of the combustion engine.

Further benefits of this disclosure provide for a decrease in waste heat when compared to traditional combustion engines. For example, traditional combustion engines can include an exhaust section that exhaust the engine exhaust gases exiting the combustion chamber to an exterior portion of the combustion engine. These engine exhaust gases are heated due to the combustion process, however, include potentially harmful contaminates, therefore, they are normally not used in other systems and instead treated through an ozone converter and exhausted to the environment. The system described herein, however, utilizes at least a portion of the engine exhaust gases, specifically the heat within the engine exhaust gases, instead of just exhausting all of the engine exhaust gases to the environment. Specifically, the combustion engine as described herein can include a bleed air supply from a downstream portion of the combustion engine that feeds fluid to a subsystem of the combustion engine. The subsystem can be, for example, the anti-ice system configured to detect ice accretion along a portion of the housing of the combustion engine or along another environment exterior the combustion engine. The fluid containing the engine exhaust gases can then be diverted to the subsystem if ice accretion is detected and the heat from the engine exhaust gases can be used to melt the ice. As such, the combustion engine as described herein decreases the amount of waste heat when compared to traditional combustion engines.

To the extent not already described, the different features and structures of the various aspects can be used in combination with others as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure herein, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further comprising aspects of the invention are provided by the subject matter of the following clauses:

A combustion engine comprising at least one combustion chamber, a first bleed air supply fluidly coupled to a portion of the combustion engine upstream of the combustion chamber, a second bleed air supply fluidly coupled to a portion of the combustion engine downstream of the combustion chamber, and a turbomachine a first compressor, a second compressor, and a first turbine mounted to a common shaft with the first and second compressors in serial flow arrangement, with the first compressor fluidly coupled to the first bleed air supply, and an intercooler serially fluidly coupling a portion of the first compressor to a portion of the second compressor.

The combustion engine of any preceding clause, the turbomachine further comprises a second turbine mounted to the common shaft and in serial flow arrangement with the first turbine, with the first turbine being fluidly coupled to at least one of the first or second bleed air supplies.

The combustion engine of any preceding clause, further comprising a turbo-ejector fluidly coupling the second compressor and the second turbine.

The combustion engine of any preceding clause, the turbo-ejector comprises a venturi defining a throat, with the venturi fluidly coupled to the second turbine, and a tap at the throat, and the second compressor is fluidly coupled to the tap.

The combustion engine of any preceding clause, further comprising a first valve fluidly coupling the first bleed air supply to the first compressor and a second valve fluidly coupling at least one of the first or second bleed air supplies to the second bleed air supply.

The combustion engine of any preceding clause, further comprising a third bleed air supply fluidly coupled downstream the combustion chamber and includes a third valve.

The combustion engine of any preceding clause, the third bleed air supply is coupled to a portion of the combustion engine downstream the second bleed air supply.

The combustion engine of any preceding clause, the third bleed air supply further includes a branch upstream the third valve, with a fourth valve fluidly coupled to the branch.

The combustion engine of any preceding clause, the third valve is fluidly coupled to the first turbine and the fourth valve is fluidly coupled to a subsystem of the combustion engine.

An aircraft comprising a gas turbine engine having a fan section, compressor section, combustion section, and turbine section in serial flow arrangement, an external system, a first bleed air supply fluidly coupled to a portion of the combustion engine upstream of the combustion chamber, a second bleed air supply fluidly coupled to a portion of the combustion engine downstream of the combustion chamber, and a turbomachine comprising a first compressor, a second compressor, and a first turbine mounted to a common shaft with the first and second compressors in serial flow arrangement, with the first compressor fluidly coupled to the first bleed air supply, and the second compressor fluidly coupled to external system, and an intercooler serially fluidly coupling a portion of the first compressor to a portion of the second compressor.

The aircraft of any preceding clause, the turbomachine further comprises a second turbine mounted to the common shaft and in serial flow arrangement with the first turbine, with the second turbine being fluidly coupled to at least one of the first or second bleed air supplies.

The aircraft of any preceding clause, the first bleed air supply is fluidly coupled to the compressor section and the second bleed air supply is fluidly coupled to the turbine section.

The aircraft of any preceding clause, further comprising a turbo-ejector fluidly coupling the second compressor and the second turbine, the turbo-ejector comprising, a venturi fluidly coupled to the second turbine and defining a throat, a tap provided the throat and fluidly coupled to the second compressor, and an output of fluidly coupled to the at least a portion of the external system.

The aircraft of any preceding clause, the external system is an Environmental Control System (ECS) and the turbo-ejector is fluidly coupled to an air conditioning pack of the ECS.

The aircraft of any preceding clause, further comprising a bypass directly fluidly coupling the first turbine to the turbo-ejector.

The aircraft of any preceding clause, the first turbine is selectively fluidly coupled to the first bleed air supply or the second bleed air supply.

The aircraft of any preceding clause, further comprising a third bleed air supply fluidly coupled to a portion of the gas turbine engine downstream of where the second bleed air supply is fluidly coupled to the gas turbine engine.

The aircraft of any preceding clause, further comprising a first valve selectively fluidly coupling the first bleed air supply to the first compressor, a second valve selectively fluidly coupling at least one of the first or second bleed air supplies to the first turbine, a third valve selectively fluidly coupling the third bleed air supply to the first turbine, and a fourth valve selectively fluidly coupling the third bleed air supply to a subsystem of the aircraft.

The aircraft of any preceding clause, the subsystem of the gas turbine engine is an anti-ice system.

The aircraft of any preceding clause, the first bleed air supply is fluidly coupled to one either the fan section or compressor section, and the second bleed air supply is fluidly coupled to one of either the turbine section or exhaust section, and the third bleed air supply is fluidly coupled to a portion of the gas turbine engine downstream where the second bleed air supply is fluidly coupled to the gas turbine engine, and the third bleed air supply further includes a pre-cooler fluidly coupled to the fan section and provided within the turbine section of the gas turbine engine.

What is claimed is:

1. A combustion engine comprising:
a combustion chamber;
a first bleed air supply selectively fluidly coupled to a portion of the combustion engine upstream of the combustion chamber, via a first controllable valve;
a second bleed air supply selectively fluidly coupled to a portion of the combustion engine downstream of the combustion chamber, via both a second controllable valve and a check valve along the second bleed air supply downstream from the second controllable valve;
a third bleed air supply selectively fluidly coupled to a portion of the combustion engine downstream of the combustion chamber, via a third controllable valve; and
a turbomachine comprising:
a first compressor, a second compressor, and a first turbine mounted to a common shaft with the first and second compressors in serial flow arrangement, with the first compressor fluidly coupled to the first bleed air supply, and
an intercooler serially fluidly coupling a portion of the first compressor to a portion of the second compressor;
wherein the third bleed air supply and the second bleed air supply meet at a junction downstream of the second controllable valve and the third controllable valve, the junction being fluidly coupled to the first turbine;
wherein the first bleed air supply is fluidly coupled to the junction via a fluid path;
wherein the check valve is disposed along the second bleed air supply upstream from the junction and is biased such that fluid within the second bleed air supply can flow through the check valve, but fluid downstream the check valve cannot flow past the check valve and into the second bleed air supply; and
wherein the third bleed air supply includes a branch with a first leg and a second leg, separate from the first leg, with the first leg being selectively fluidly coupled to the junction.

2. A combustion engine comprising:
a combustion chamber;
a subsystem;
an upstream bleed air supply fluidly coupled to a first fluid flow from a portion of the combustion engine that is upstream of the combustion chamber; a first downstream bleed air supply fluidly coupled to a second fluid flow from a portion of the combustion engine that is downstream of the combustion chamber and selectively fluidly coupled to the subsystem;
a second downstream bleed air supply fluidly coupled to a third fluid flow from a portion of the combustion engine that is downstream of the combustion chamber and selectively fluidly coupled to the subsystem;
a turbomachine selectively fluidly coupled to a system external to the combustion engine and separate from the subsystem, the turbomachine comprising:
a first compressor that is selectively fluidly coupled to the first fluid flow from the upstream bleed air supply; and
a first turbine that is selectively fluidly coupled to at least the second fluid flow from the first downstream bleed air supply and the third fluid flow from the second downstream bleed air supply, with the first turbine being mounted to a common shaft with the first compressor in serial flow arrangement;

a first controllable valve selectively fluidly coupling the upstream bleed air supply to the turbomachine;

a second controllable valve selectively fluidly coupling the first downstream bleed air supply to the first turbine;

a third controllable valve selectively fluidly coupling the second downstream bleed air supply to the first turbine, the third fluid flow and the second fluid flow meeting at a junction downstream of the second controllable valve and the third controllable valve; and a check valve fluidly coupling the first downstream bleed air supply to the junction between the second controllable valve and the junction, the check valve being biased such that fluid within the first downstream bleed air supply can flow through the check valve, but fluid downstream the check valve cannot flow past the check valve and into the first downstream bleed air supply.

3. The combustion engine of claim 2, wherein the turbomachine further comprises a second compressor in serial flow arrangement with the first compressor and a second turbine mounted to the common shaft and in serial flow arrangement with the first turbine, with the first turbine being fluidly coupled to at least one of the upstream bleed air supply, the first downstream bleed air supply, or the second downstream bleed air supply.

4. The combustion engine of claim 3, further comprising a turbo-ejector fluidly coupling the second compressor and the second turbine.

5. The combustion engine of claim 4, wherein the turbo-ejector comprises a venturi defining a throat, with the venturi fluidly coupled to the second turbine, and a tap upstream of the throat, and the second compressor is fluidly coupled to the tap.

6. The combustion engine of claim 2, further comprising a pre-cooler provided within the combustion engine, the pre-cooler being thermally coupled to an upstream portion of the combustion engine and the second downstream bleed air supply.

7. The combustion engine of claim 2, wherein the second downstream bleed air supply further includes a branch with a first leg and a second leg, with the first leg being selectively fluidly coupled to the first turbine and the second leg being selectively fluidly coupled to the subsystem.

8. The combustion engine of claim 2, wherein the first fluid flow within the first compressor and the second fluid flow within the first turbine are selectively fluidly coupled to the system external to the combustion engine.

9. The combustion engine of claim 2, wherein the system external to the combustion engine is an Environmental Control System (ECS).

10. An aircraft comprising:

a gas turbine engine having a fan section, compressor section, combustion section, and turbine section in serial flow arrangement;

an Environmental Control System (ECS);

a first bleed air supply fluidly coupled, via a first controllable valve, to a first fluid flow from a portion of the gas turbine engine that is upstream of the combustion section; a second bleed air supply fluidly coupled, via a second controllable valve and a check valve, to a second fluid flow from a portion of the gas turbine engine that is downstream of the combustion section;

a third bleed air supply fluidly coupled, via a third controllable valve, to a third fluid flow from a portion of the gas turbine engine that is downstream of the combustion section, the second bleed air supply and the third bleed air supply meeting at a junction that is downstream of both the second controllable valve and the third controllable valve; and a turbomachine comprising:

a first compressor that is selectively fluidly coupled to the first fluid flow from the first bleed air supply; and a first turbine that is selectively fluidly coupled to at least the second fluid flow from the second bleed air supply and the third fluid flow from the third bleed air supply, with the first turbine being mounted to a common shaft with the first compressor;

wherein the first fluid flow, the second fluid flow, and the third fluid flow are selectively fluidly coupled to the ECS via the first compressor and the first turbine, respectively, wherein the check valve is disposed downstream of the second controllable valve and upstream of the junction on the second bleed air supply, the check valve being biased such that fluid within the second bleed air supply can flow through the check valve, but fluid downstream the check valve cannot flow past the check valve and into the second bleed air supply.

11. The aircraft of claim 10, wherein the turbomachine further comprises a second turbine mounted to the common shaft and in serial flow arrangement with the first turbine, with the second turbine being fluidly coupled to at least one of the first bleed air supply, the second bleed air supply, or the third bleed air supply.

12. The aircraft of claim 11, wherein the first bleed air supply is fluidly coupled to the compressor section and the second bleed air supply is fluidly coupled to the turbine section.

13. The aircraft of claim 11, further comprising a turbo-ejector fluidly coupling the first compressor and the first turbine, the turbo-ejector comprising:

a venturi fluidly coupled to the second turbine and defining a throat;

a tap provided upstream of the throat and fluidly coupled to the first compressor; and an output of fluidly coupled to the at least a portion of the ECS.

14. The aircraft of claim 13, further comprising a bypass directly fluidly coupling the first turbine to the turbo-ejector.

15. The aircraft of claim 10, wherein the first turbine is selectively fluidly coupled to the first bleed air supply, the second bleed air supply, or the third bleed air supply.

16. The aircraft of claim 10, wherein the gas turbine engine further comprises:

a fan section;

a bypass air duct including a fluid from the fan section; and a pre-cooler provided within the bypass air duct and being thermally coupled to the fluid from the fan section and fluidly coupled to the third bleed air supply.

17. The aircraft of claim 10, further comprising a subsystem of the gas turbine engine, the third fluid flow being selectively fluidly coupled to the subsystem and the first turbine.

* * * * *